(12) United States Patent
Hoye et al.

(10) Patent No.: US 12,111,865 B2
(45) Date of Patent: *Oct. 8, 2024

(54) VIDEO ANALYSIS FOR EFFICIENT SORTING OF EVENT DATA

(71) Applicant: Lytx, Inc., San Diego, CA (US)

(72) Inventors: Brett Hoye, San Marcos, CA (US); Stephen Krotosky, San Diego, CA (US)

(73) Assignee: Lytx, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/975,251

(22) Filed: Oct. 27, 2022

(65) Prior Publication Data

US 2023/0103670 A1    Apr. 6, 2023

Related U.S. Application Data

(63) Continuation of application No. 15/868,654, filed on Jan. 11, 2018, now Pat. No. 11,615,141.

(51) Int. Cl.
*G06F 16/00* (2019.01)
*G06F 16/783* (2019.01)
*G07C 5/08* (2006.01)

(52) U.S. Cl.
CPC ......... *G06F 16/783* (2019.01); *G07C 5/0866* (2013.01)

(58) Field of Classification Search
CPC .............. G06F 16/783; G07C 5/0866; B60W 2040/0881; G06V 20/41; G06V 20/44
See application file for complete search history.

(56) References Cited

U.S. PATENT DOCUMENTS

| | | | |
|---|---|---|---|
| 2014/0277833 A1 | 9/2014 | Palan | |
| 2018/0039820 A1* | 2/2018 | Begeja | ................ G06V 20/52 |
| 2018/0075309 A1* | 3/2018 | Sathyanarayana | ... G05D 1/0055 |
| 2018/0130369 A1 | 5/2018 | Mcquade | |

* cited by examiner

*Primary Examiner* — Paul Kim
(74) *Attorney, Agent, or Firm* — Van Pelt, Yi & James LLP

(57) ABSTRACT

A system for sorting event data includes an interface and a processor. The interface is configured to receive a small set of video frame data from a vehicle event recorder. The processor is configured to determine that the small set of video frame data indicates to fetch more vehicle event recorder data; determine a categorization based at least in part on the more vehicle event recorder data; and in response to the categorization, route the more vehicle event recorder data to a reviewing queue.

18 Claims, 9 Drawing Sheets

| Use Case | Unauthorized Passenger | Overflowing Trash Bin |
|---|---|---|
| Event Indicator | Vehicle pulls to side of road then continues | Trash lift activated |
| Small Data Set | 6 video frames of vehicle cab interior | 6 video frames of trash bin |
| Initial Review | Use machine vision to look for passenger | Use machine vision to look for overflowing bins |
| Further Review | If necessary, manually review video frames | If necessary, manually review video frames<br><br>Request GPS data if overflowing bins detected |

Fig. 4

| Use Case | Lane Departure | Rolling Stop |
|---|---|---|
| Event Indicator | Lane departure warning triggered | Vehicle travels through intersection believed to have a stop sign without accelerometer registering a stop |
| Small Data Set | 1 video frame facing forward | 6 video frames facing forward through intersection |
| Initial Review | Use machine vision to look for coachable action | Use machine vision to look for stop sign |
| Further Review | Request 10 seconds of video; manually review if necessary | Request 10 seconds of video; manually review if necessary |

Fig. 5

VIDEO ANALYSIS FOR EFFICIENT SORTING OF EVENT DATA

CROSS REFERENCE TO OTHER APPLICATIONS

This application is a continuation of U.S. patent application Ser. No. 15/868,654 entitled VIDEO ANALYSIS FOR EFFICIENT SORTING OF EVENT DATA filed Jan. 11, 2018 which is incorporated herein by reference for all purposes.

BACKGROUND OF THE INVENTION

Modern vehicles (e.g., airplanes, boats, trains, cars, trucks, etc.) can include a vehicle event recorder in order to better understand the timeline of an anomalous event (e.g., an accident). A vehicle event recorder typically includes a set of sensors, e.g., video recorders, audio recorders, accelerometers, gyroscopes, vehicle state sensors, GPS (global positioning system), etc., that report data, which is used to determine the occurrence of an anomalous event. The vehicle event recorder is typically able to provide only limited processing capability compared with a server system not residing on the vehicle. A server system is able to apply its greater power to make more accurate decisions than the vehicle event recorder, and is able to refer decisions to a manual review system for manual review in the event it is not able to determine whether an event occurred. However, manual review is very expensive compared with automatic review. In addition, network data transfer between the vehicle event recorder and the server system is very expensive. This creates a problem wherein the system needs to review data while transferring as little data as possible over the network and performing manual review only when necessary.

BRIEF DESCRIPTION OF THE DRAWINGS

Various embodiments of the invention are disclosed in the following detailed description and the accompanying drawings.

FIG. 4 is a diagram illustrating an embodiment of use case information for use cases for video analysis for efficient sorting of event data.

FIG. 5 is a diagram illustrating an embodiment of use case information for use cases for video analysis for efficient sorting of event data.

DETAILED DESCRIPTION

Figure 1:
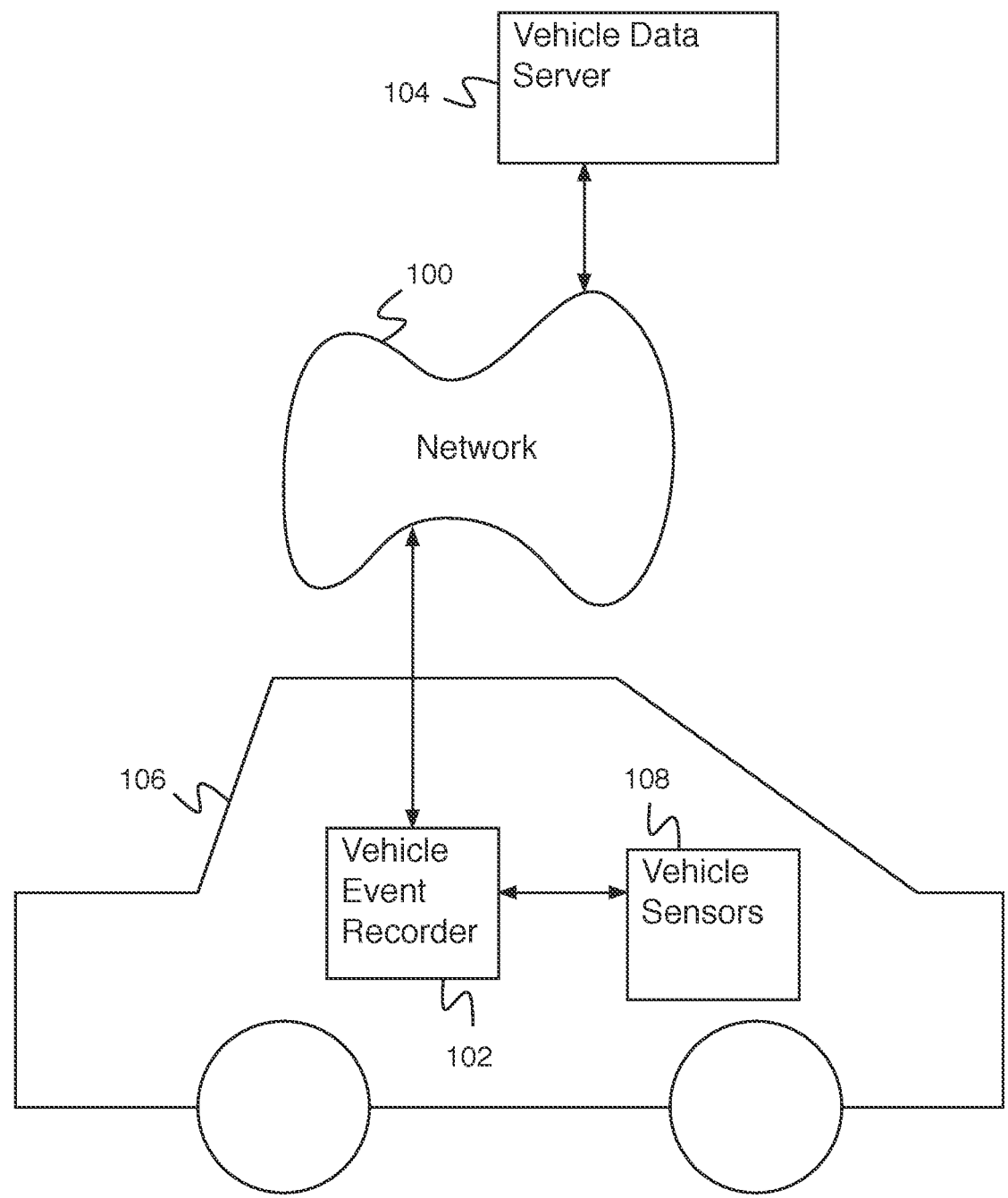
FIG. 1 is a block diagram illustrating an embodiment of a system including a vehicle event recorder.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for sorting event data comprises an interface configured to receive a small set of video frame data from a vehicle event recorder, and a processor configured to determine that the small set of video frame data indicates to fetch more vehicle event recorder data, determine a categorization based at least in part on the more vehicle event recorder data, and in response to the categorization, route the more vehicle event recorder data to a reviewing queue (e.g., a machine vision reviewing queue or a human reviewing queue). The system for sorting event data additionally comprises a memory coupled to the processor and configured to provide the processor with instructions.

A system for sorting event data comprises a server system in communication with one or more vehicle event recorder systems via a network. The vehicle event recorder systems capture data, including video data, audio data, accelerometer data, global positioning system (e.g., GPS) data, etc. The computing power available to the server system is much greater than the computing power available to the vehicle event recorder systems and more powerful analysis can be performed on the server system. When a vehicle event recorder system determines a possibility of an occurrence of an anomalous event, it selects a small data set—for example, a small number of frames of video—and uploads the small data set to the vehicle data server. The small data set has to be kept to a small size in order to minimize bandwidth costs. The server system performs an initial analysis on the small data set in order to determine the likelihood of an anomalous event. For example, the server system performs the initial analysis using machine vision techniques. In the event the server is able to determine with high likelihood that an anomalous event has occurred or that an anomalous event has not occurred based on the analysis of the small data set, the determination is made (e.g., anomalous event or no anomalous event) and further processing is not needed. In the event the server is not able to make a determination based on the analysis of the small data set, further processing occurs. For some event types, the small data set is provided for further review to a reviewing station (e.g., a manual reviewing station). For other event types, a larger vehicle event recorder data set (e.g., more vehicle event recorder data) is requested. For example, more video frames are requested, continuous video is requested, GPS data is requested, other sensor data is requested, etc. The larger vehicle event recorder data set is analyzed and again a determination of whether or not an event has occurred is attempted. In the event the server is able to determine that an anomalous event has occurred or that an anomalous event has not occurred based on the analysis of the more vehicle event recorder data, the determination is made (e.g., anomalous event or no anomalous event) and further processing is not needed. In the event the server is not able to make a determination based on the analysis of the more vehicle event recorder data, the more vehicle event recorder data is provided for further review to a reviewing station. Data provided to a reviewing station (e.g., the small data set or the more vehicle event recorder data) is first categorized in order to determine a reviewing queue (e.g., based on the data type, the event type, the use case, etc.). Data is then reviewed using the reviewing queue (e.g., by a machine vision reviewing queue or by a manual reviewer associated with the reviewing queue). A final determination of whether an anomalous event has occurred is determined by the reviewer associated with the reviewing queue.

The system for sorting event data makes the vehicle data server computer better by minimizing the network data transfer (e.g., by performing as much analysis as is possible on the small data set) and by minimizing the number of times a manual review is required (e.g., by performing as much analysis as possible automatically before a manual review is requested by adding new analysis of video). The cost incurred by the vehicle data server to determine whether an anomalous event has occurred is therefore reduced.

FIG. 1 is a block diagram illustrating an embodiment of a system including a vehicle event recorder. In the example shown, vehicle data server 104 comprises a vehicle data server for communicating with vehicle event recorder 102 via network 100. Vehicle data server 104 receives data, processes data, stores data, requests more data, provides stored data, etc. In some embodiments, vehicle data server 104 comprises a system for video analysis for efficient sorting of event data. When vehicle event recorder 102 detects a signal indicating a possible anomalous event, it uploads a small data set to vehicle data server 104. The small data set comprises a small number of frames of video data (e.g., N frames—for example, 6 video frames). Vehicle data server 104 performs an initial analysis on the small data set. For example, the initial analysis is performed using machine vision techniques. For some event types, the initial analysis is enough to satisfactorily determine whether an anomalous event has occurred. In the event it is determined that an anomalous event has occurred, an anomalous event indication is stored, an anomalous event indication is provided to vehicle event recorder 102, etc. In the event that the initial analysis indicates only a possibility that an anomalous event has occurred, vehicle data server 104 provides an indication to vehicle event recorder 102 requesting more data. For example, video data or sensor data is requested. Vehicle event recorder 102 provides the more data to vehicle data server 104. Vehicle data server 104 then performs a further analysis on the more data. In the event that the further analysis indicates that an anomalous event has occurred, an anomalous event indication is stored, an anomalous event indication is provided to vehicle event recorder 102, etc. In the event that the further analysis indicates only a possibility that an anomalous event has occurred, a categorization is determined based at least in part on the more vehicle event recorder data. The categorization comprises a categorization for a reviewing queue, for example movement analysis or collision analysis. In response to the categorization, the more vehicle event recorder data is routed to the reviewing queue. A review is received from the reviewing queue indicating a final determination of the presence of an anomalous event in the vehicle event recorder data. In the event it is determined that an anomalous event has occurred, an anomalous event indication is stored, an anomalous event indication is provided to vehicle event recorder 102, etc.

Vehicle event recorder 102 comprises a vehicle event recorder mounted in a vehicle (e.g., a truck). Vehicle event recorder 102 is in communication with external sensors (e.g., vehicle sensors 108) and internal sensors of vehicle event recorder 102. Vehicle sensors 108 and internal sensors comprise one or more sensors—for example, one or more video recorders, audio recorders, accelerometers, gyroscopes, vehicle state sensors, proximity sensors, a global positioning system (e.g., GPS), outdoor temperature sensors, moisture sensors, laser line tracker sensors, etc. Vehicle state sensors comprise internal vehicle state sensors—for example, a speedometer, an accelerator pedal sensor, a brake pedal sensor, an engine revolutions per minute (e.g., RPM) sensor, an engine temperature sensor, a headlight sensor, an airbag deployment sensor, driver and passenger seat weight sensors, an anti-locking brake sensor, traction control system sensors, drive wheel speed sensors, shocks sensors, an engine exhaust sensor, a gear position sensor, a cabin equipment operation sensor, etc. Vehicle event recorder 102 comprises a system for receiving and processing sensor data. Processing sensor data comprises filtering data, identifying patterns in data, detecting events, etc. Vehicle event recorder 102 is mounted on vehicle 106 in any appropriate location— for example the chassis, the front grill, the dashboard, the rear-view mirror, the rear window or wall, the floor, etc. There are times when vehicle event recorder 102 comprises multiple units mounted in different locations within vehicle 106 instead of a single unit, particularly when there are space constraints for a given location (e.g., behind the rear view mirror) and more space is required to house electronic components. Vehicle event recorder 102 comprises a communications system for communicating with network 100. Network 100 comprises a network for communications. Network 100 comprises one or more of a wireless network, a wired network, a cellular network, a Code Division Multiple Access (CDMA) network, a Global System for Mobile Communication (GSM) network, a Long-Term Evolution (LTE) network, a Universal Mobile Telecommunications System (UMTS) network, a Worldwide Interoperability for Microwave Access (WiMAX) network, a Dedicated Short-Range Communications (DSRC) network, a local area network, a wide area network, the Internet, etc. There are instances when network 100 comprises multiple networks— for instance, multiple interconnected networks spanning different regions, networks operating at different times, overlaid networks with different access permissions, networks with different bandwidth, etc. Different networks comprising network 100 typically comprise different bandwidth cost (e.g., a wired network has a very low cost, a wireless Ethernet connection has a moderate cost, a cellular data network has a high cost). In some embodiments, network 100 has a different cost at different times (e.g., a higher cost during the day and a lower cost at night). Vehicle event recorder 102 communicates with vehicle data server 104 via network 100.

Figure 2:
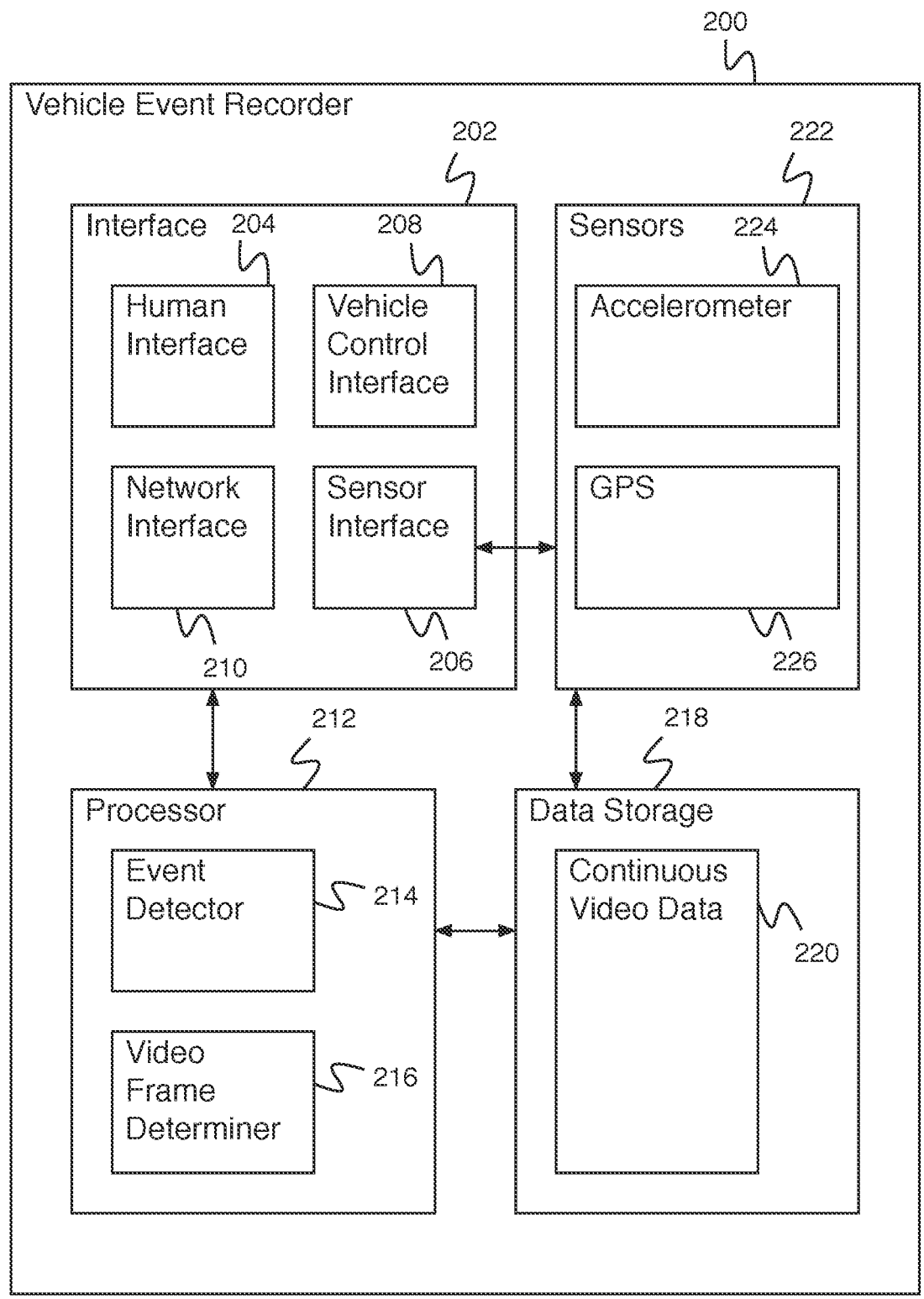
FIG. 2 is a block diagram illustrating an embodiment of a vehicle event recorder.

FIG. 2 is a block diagram illustrating an embodiment of a vehicle event recorder. In some embodiments, vehicle event recorder 200 of FIG. 2 comprises vehicle event recorder 102 of FIG. 1. In the example shown, vehicle event recorder 200 process sensor data using processor 212. Processor 212 receives sensor data via sensor interface 206 of interface 202 and from internal sensors (e.g., GPS 226 or accelerometer 224 of sensors 222). Processor 212 determines a likely event using event detector 214 and then determines a set of video frames to send to a server using video frame determiner 216. The set of video frames is uploaded via network interface 210 to a vehicle data server. The vehicle data server makes a determination of whether more information is needed to determine an event. In response to a determination that more vehicle event recorder data is needed to determine an event, the vehicle data server provides a request to vehicle event recorder 200 for the more vehicle event recorder data. Vehicle event recorder 200 then transmits more vehicle event recorder data regarding the likely event—for example, sensor data, vehicle data, vehicle identification data, anomalous event data, driver quality data, video frame data, continuous video data, etc. to the vehicle data server.

Vehicle event recorder 200 comprises interface 202. Interface 202 comprises a set of interfaces to other systems. Human interface 204 comprises an interface to a human interaction system—for example, an audio output, a display output, etc. Sensor interface 206 comprises an interface to one or more sensors for receiving sensor data. Sensor interface 206 comprises an interface to one or more vehicle event recorder sensors. In various embodiments, vehicle event recorder sensors comprise an exterior video camera, an exterior still camera, an interior video camera, an interior still camera, a microphone, an accelerometer, a gyroscope, an outdoor temperature sensor, a moisture sensor, a laser line tracker sensor, vehicle state sensors, or any other appropriate sensors. In various embodiments, vehicle state sensors comprise a speedometer, an accelerator pedal sensor, a brake pedal sensor, an engine revolutions per minute (RPM) sensor, an engine temperature sensor, a headlight sensor, an airbag deployment sensor, driver and passenger seat weight sensors, an anti-locking brake sensor, shocks sensors, an engine exhaust sensor, a gear position sensor, a turn signal sensor, a cabin equipment operation sensor, or any other appropriate vehicle state sensors. In some embodiments, sensor interface 206 comprises an on-board diagnostics (OBD) bus (e.g., society of automotive engineers (SAE) J1939, J1708/J1587, OBD-II, CAN BUS, etc.). In some embodiments, vehicle event recorder 200 communicates with vehicle state sensors via the OBD bus.

Vehicle control interface 208 comprises an interface to one or more vehicle control systems (e.g., for adjusting vehicle control parameters, for putting the vehicle in a safe mode, for adjusting an automatic driving control parameter, etc.). Network interface 210 comprises a network interface for communicating with other systems via a network (e.g., network 100 of FIG. 1). Network interface 210 comprises one or more of a GSM interface, a CDMA interface, an LTE interface, a WiFi™ interface, an Ethernet interface, a Universal Serial Bus (USB) interface, a Bluetooth™ interface, an Internet interface, etc. Processor 212 comprises a processor for controlling the operations of vehicle event recorder 200, for reading and writing information on data storage 218, for reading and/or writing data via interface 202, etc. Processor 212 comprises event detector 214 for determining events from data (e.g., video data, sensor data, etc.). Processor 212 additionally comprise video frame determiner 216 for selecting one or more video frames from continuous video data (e.g., continuous video data 220). The one or more video frames comprise a small data set (e.g., a small data set for providing to a vehicle data server for an initial analysis).

Data storage 218 comprises a data storage (e.g., a random access memory (RAM), a read only memory (ROM), a nonvolatile memory, a flash memory, a hard disk, or any other appropriate data storage). Data storage 218 comprises a data storage for storing instructions for processor 212, vehicle event recorder data, vehicle event data, sensor data, video data, driver scores, vehicle information, vehicle identifying information, anomalous event information, driver quality information, etc. Data storage 218 comprises continuous video data 220 comprising stored continuous video data from one or more cameras mounted on the vehicle for a previous time period (e.g., 1 minute, 5 minutes, 1 hour, 1 day, etc.).

Figure 3:
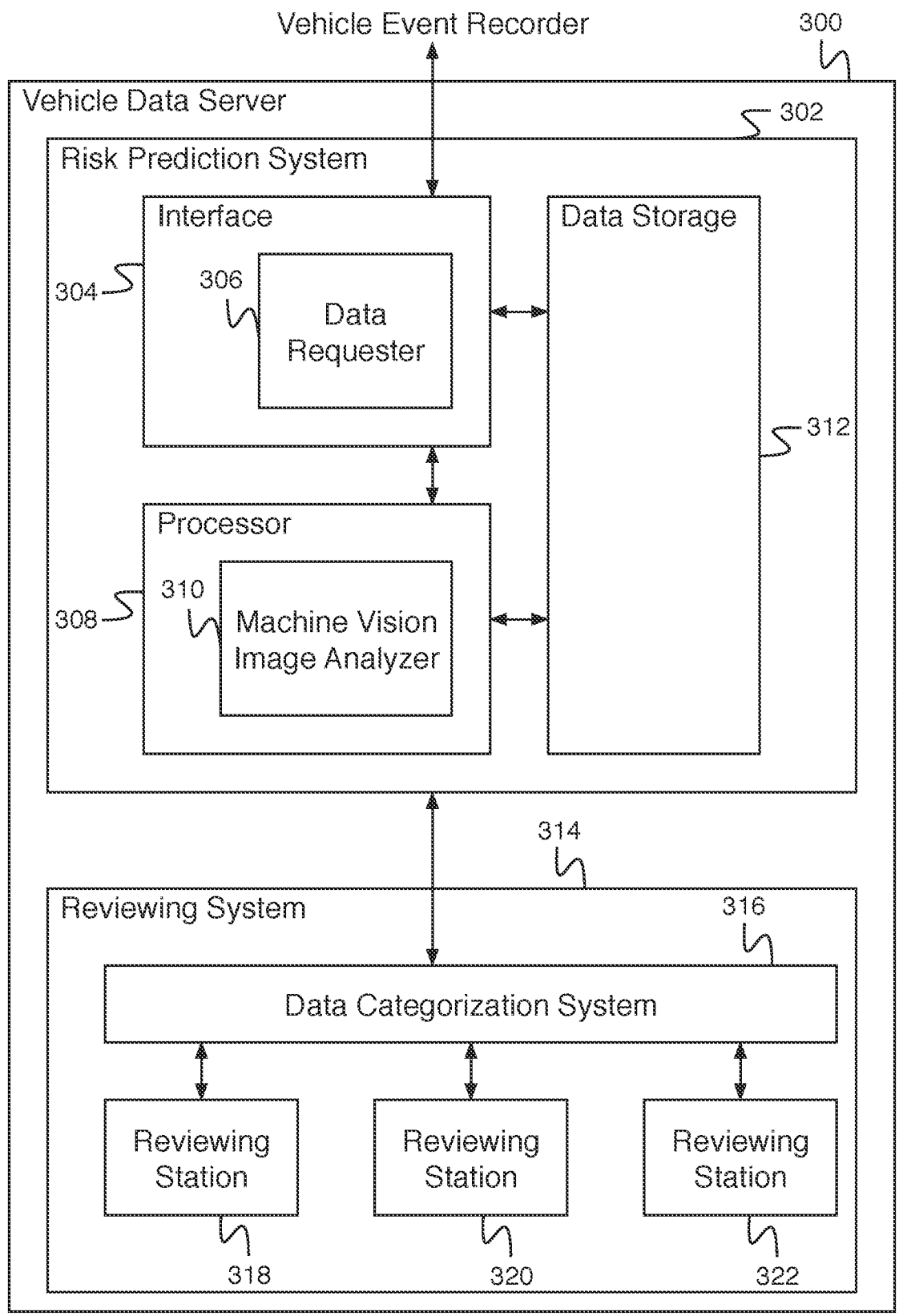
FIG. 3 is a block diagram illustrating an embodiment of a vehicle data server.

FIG. 3 is a block diagram illustrating an embodiment of a vehicle data server. In some embodiments, vehicle data server 300 comprises vehicle data server 104 of FIG. 1. In the example shown, vehicle data server 300 receives a small data set comprising a set of video frames from a vehicle event recorder in response to the vehicle event recorder determining the possibility of an event. The small data set is received by interface 304 and processed by processor 308 (e.g., by machine vision image analyzer 310). In the event that processor 308 determines that no anomalous event has occurred, no further processing is required. In the event processor 308 determines that an anomalous event has occurred, an anomalous event indication is stored. In the event processor 308 determines that the small data set should be reviewed by a reviewing system, the small data set is provided to reviewing system 314. In the event that processor 308 determines that more vehicle event recorder data is required, via interface 304 (e.g., using data requestor 306) a request is made for more vehicle event recorder data. More vehicle event recorder data is received by interface 304 and analyzed by processor 308 (e.g., by machine vision image analyzer 310). In the event that processor 308 determines that no anomalous event has occurred having analyzed the more vehicle event recorder data, no further processing is required. In the event that processor 308 determines that an anomalous event has occurred having analyzed the more vehicle event recorder data, an anomalous event indication is stored. In the event that processor 308 determines that the more vehicle event recorder data should be reviewed by a reviewing system, the more vehicle event recorder data is provided to reviewing system 314. When reviewing system 314 receives data (e.g., a small data set or a set of more vehicle event recorder data), the data is categorized using data categorization system 316 and reviewed using an appropriate reviewing station. In the event that the review at the reviewing station indicates that an anomalous event has occurred, an anomalous event indication is stored.

Vehicle data server 300 comprises interface 304, processor 308, and data storage 312. Interface 304 comprises an interface for communicating with one or more network systems (e.g., vehicle event recorders, administrator systems, user systems, database systems, etc.) via a network. Interface 304 comprises data requester 306 for requesting data from a vehicle event recorder. Interface 304 additionally comprises an interface for receiving data from a vehicle event recorder. Processor 308 comprises a processor for processing data. Processor 308 comprises machine vision image analyzer 310 for analyzing images using machine vision. Machine vision image analyzer 310 comprises an image analyzer for determining whether video frames indicate an anomalous event occurred, for determining whether video frames indicate that more vehicle event recorder data is required to determine whether an anomalous event occurred, for determining whether continuous video indicates an anomalous event occurred, for determining whether continuous video indicated further review is required to determine whether anomalous event occurred, etc. A machine learning model, such as a deep convolutional neural network, is trained to predict the likelihood whether an image is an anomaly based on a training set of human-labeled images containing examples of a predefined set of anomalies and normal images. Examples of anomalies could be smoking, improper seatbelt use, unauthorized passengers, etc. From the training examples, the model learns to holistically discriminate between the classes of labeled imagery. A training set of at least 1000 examples per anomaly is typically required to achieve acceptable performance. Performance can improve as the number of examples increases and the coverage of intra-class variability improves. A single universal model can be built for all anomalies, or specialty models for each anomaly can be built depending on performance needs. Saturation of model performance can be observed by comparing model performance versus number of training examples. Depending on the model design, the number of examples can influence overall size and complexity, so the sweet spot between performance and complexity is typically identified experimentally. The model is verified by using a metric and testing on a second set of examples or the model is trained on a large fraction of the set (e.g., 80%) and then tested on the remaining portion (e.g., 20%). This testing is then repeated leaving out different portions of the training set for testing (e.g., the first 20%, the second 20%, the third 20%, the fourth 20%, the fifth 20%, or interleaved sets of 20%, etc.). If the model verification metric is above a threshold, the model is used to automatically score for anomalous events. The scores for each video frame are then aggregated to make an ensemble score for the state of a video clip of an event. The value of this score is then used to determine how to proceed with the event. For example, let's say a higher score indicates that the event is an anomalous event, then scores below a first threshold can be automatically rejected, scores between the first threshold and a second threshold can be sent to manual review for confirmation, and scores above the second threshold can be allowed to bypass manual review as they are highly likely to be anomalous cases. In some embodiments, a high score indicates that the event is not an anomalous event, then scores above a first threshold can be automatically rejected, scores between the first threshold and a second threshold can be sent to manual review for confirmation, and scores below the second threshold can be allowed to bypass manual review as they are highly likely to be anomalous cases. Risk prediction system 302 is in communication with reviewing system 314. Reviewing system 314 comprises a system for analyzing data using a further review. In some embodiments, reviewing system 314 comprises a system for analyzing data using a manual review. Reviewing system 314 receives data from risk prediction system 302 for a further review. Reviewing system 314 comprises data categorization system 316. Data categorization system 316 comprises a system for categorizing data based on a required review type. Required review types comprise not interesting, human review, collision review, movement analysis, etc. Data categorization system 316 routes data for further review to one or more of reviewing station 318, reviewing station 320, and reviewing station 322 based at least in part on a determined review type.

FIG. 4 is a diagram illustrating an embodiment of use case information for use cases for video analysis for efficient sorting of event data. In the example shown, the use cases of FIG. 4 comprise an unauthorized passenger use case and an overflowing trash bin use case. For each use case, an event indicator (e.g., an initial indication received by a vehicle event recorder indicating that the event could be occurring), a small data set (e.g., a small data set uploaded by the vehicle event recorder to a vehicle data server), an initial review (e.g., the initial review performed on the small data set by the vehicle data server), and a further review (e.g., a further review process taken after the initial review) are shown. For the unauthorized passenger use case, the event indicator comprises a measurement indicating that the vehicle pulled to the side of the road and then continued. It is possible that the vehicle pulled to the side of the road to pick up a passenger. In some cases, the small data set comprises 6 video frames of the vehicle cab interior. The 6 video frames should comprise enough information to make an automatic determination of whether a passenger is riding in the vehicle. The initial review of the small data set comprises using machine vision to look for a passenger within the 6 video frames. The further review step comprises using a manual review of the video frames in the event that the initial review is not able to make a confident determination.

For the overflowing trash bin use case, the event indicator comprises a signal that a trash lift has been activated (e.g., on a garbage truck). Each time the trash lift is activated (e.g., each time the garbage truck picks up garbage) the trash bin that is being emptied is checked in order to determine whether it is overflowing. The small data set comprises 6 video frames of the trash bin, for example, as it is being emptied into the truck. The initial review of the small data set comprises using machine vision to look for overflowing trash bins within the 6 video frames. The further review comprises manually reviewing the video frames in the event that the initial review is not able to make a confident determination. Additionally, in the event a determination is made that overflowing bins are detected (e.g., either in the initial review or the further review), GPS data associated with the event is requested from the vehicle event recorder (e.g., in order to make a determination of the customer responsible for the overflowing bins).

A machine learning model, such as a deep convolutional neural network, is trained to predict the likelihood an image contains an overflowing trash bin based on a training set of human-labeled images containing examples of overflowing and non-overflowing bins. From the training examples, the model learns to holistically discriminate between the classes of labeled imagery. The model is verified by using a metric and testing on a second set of examples or the model is trained on a large fraction of the set (e.g., 80%) and then tested on the remaining portion (e.g., 20%). This testing is then repeated leaving out different portions of the training set for testing (e.g., the first 20%, the second 20%, the third 20%, the fourth 20%, the fifth 20%, or interleaved sets of 20%, etc.). A training set of at least 1000 examples per class is typically required to achieve acceptable performance. Performance can improve as the number of examples increases and the coverage of intra-class variability improves. Saturation of model performance can be observed by comparing model performance versus number of training examples. Depending on the model design, the number of examples can influence overall size and complexity, so the sweet spot between performance and complexity is typically identified experimentally. If the model verification metric is above a threshold, the model is used to automatically score for overflowing trash bins. The scores for each video frame are then aggregated to make an ensemble score for the state of a trash bin. The value of this score is then used to determine how to proceed with the event. For example, let's say a higher score indicates that the event is an overflowing trash bin, then scores below a first threshold can be automatically rejected, scores between the first threshold and a second threshold can be sent to manual review for confirmation, and scores above the second threshold can be allowed to bypass manual review as they are highly likely to be an overflowing trash bin. In some embodiments, a high score indicates that the event is not an overflowing trash bin, then scores above a first threshold can be automatically rejected, scores between the first threshold and a second threshold can be sent to manual review for confirmation, and scores below the second threshold can be allowed to bypass manual review as they are highly likely to be an overflowing trash bin.

FIG. 5 is a diagram illustrating an embodiment of use case information for use cases for video analysis for efficient sorting of event data. In the example shown, the use cases of FIG. 5 comprise a lane departure use case, a lane drifting use case, and a rolling stop use case. For each use case, an event indicator, a small data set, an initial review, and a further review are shown. For the lane departure use case, the event indicator comprises a lane departure warning triggered. The vehicle event recorder comprises a set of triggers for determining whether a lane departure event may have occurred. For example, a line tracker sensor determines that the vehicle may have touched the lane marker line, an accelerometer determines that the vehicle swerved, etc. The small data set comprises 1 video frame from an inward facing camera. For example, it is determined that an inward video frame shows no distraction or drowsy condition such as Cell Phone, Food & Drink, head position down, etc. during a lane departure event and that likely there is no coachable behavior present in the video so more video or other data will not be transferred from the device. The initial review of the small data set comprises using machine vision to look for a coachable action, for example, an indication that the lane departure was due to a driver distraction or being drowsy. One approach to determining whether the lane departure is caused by a coachable action is to determine whether an explanation for the lane departure is evident in the small data set, for example, a driver using a cell phone or being drowsy (e.g., the driver is detected as having their head down). If a possible coachable behavior is detected, then further review comprises requesting S seconds of video (e.g., S=10 or 12 or any other appropriate time in seconds of video). The S seconds of video is reviewed by machine learning to determine whether the lane departure was caused by a coachable behavior by the driver, and is manually reviewed if necessary.

For the lane drifting use case, the event indicator comprises a lane drifting warning triggered. The vehicle event recorder comprises a set of triggers for determining whether a lane drifting event may have occurred. For example, a vehicle event recorder determines that the vehicle may have a drifting behavior by using a crossing of a threshold of a cumulative number of fitness to lane issues over a period of time, where a fitness to lane issue comprises the inability to track the vehicle consistently between the lanes as determined using a line tracker sensor, a slow swerve of a vehicle within a lane as determined using an accelerometer, lane tracking, etc. In some embodiments, the cumulative number of fitness to lane issues are used to determine a weaving score and a threshold is used to determine triggering of a lane drifting event. The small data set comprises 6 video frames from an inward facing camera. For example, it is determined through machine vision algorithms that an inward video frame shows no distraction or drowsy condition such as Cell Phone, Food & Drink, head position down, etc. during the lane drifting event and that likely there is no coachable behavior present in the video so, for a number of tries, additional small data sets are sent from the vehicle event recorder to a vehicle data server and it is determined whether an additional small data set includes a video frame with a distracted or drowsy condition. The initial review of a small data set uses machine vision to look for a coachable action, for example, an indication that the lane drifting was due to a driver distraction or being drowsy. One approach to determining whether the lane drifting is caused by a coachable action is to determine whether an explanation for the lane drifting is evident in the small data set, for example, a driver using a cell phone or being drowsy (e.g., the driver is detected as having their head down). If a possible coachable behavior is detected, then further review comprises requesting S seconds of video (e.g., S=10 or 12 or any other appropriate time in seconds of video) around the small data set. The S seconds of video is reviewed by machine learning to determine whether the lane drifting was caused by a coachable behavior by the driver, and is manually reviewed if necessary.

For the rolling stop use case, the event indicator comprises an indication that the vehicle has travelled through an intersection believed to have a stop sign without the accelerometer registering a stop. The vehicle event recorder stores a map including traffic controls present at different locations, however, the presence of the stop sign should be positively confirmed before a driver is punished for rolling through it. The small data set comprises 6 video frames taken by a forward facing camera as the vehicle travels through the intersection. An initial review step comprises using machine vision to look for a stop sign in the 6 video frames. If the stop sign is not confirmed, then the video is not transferred or reviewed. In some use cases the system is configured to perform a further review in the event a positive determination of a stop sign is made by the initial review, such that the stop sign is always confirmed by a video review. The further review comprises requesting S seconds of video (e.g., S=10 or 12 or any other appropriate time in seconds). The S seconds of video is reviewed by machine learning to determine whether the stop sign is present, and is manually reviewed if necessary.

A machine learning model, such as a deep convolutional neural network, is trained to localize a stop sign in an image based on a training set of human-annotated images containing stop signs and their corresponding bounding box outline. From the training examples, the model learns to holistically localize stop signs in the scene. The model is verified by using a metric and testing on a second set of examples or the model is trained on a large fraction of the set (e.g., 80%) and then tested on the remaining portion (e.g., 20%). This testing is then repeated leaving out different portions of the training set for testing (e.g., the first 20%, the second 20%, the third 20%, the fourth 20%, the fifth 20%, or interleaved sets of 20%, etc.). A training set of at least 1000 examples is typically required to achieve acceptable performance. Performance can improve as the number of examples increases and the coverage of intra-class variability improves. Saturation of model performance can be observed by comparing model performance versus number of training examples. Depending on the model design, the number of examples can influence overall size and complexity, so the sweet spot between performance and complexity is typically identified experimentally. If the model verification metric is above a threshold, the model is used to automatically score for the presence of a stop sign. The value of this score is then used to determine how to proceed with the event. For example, let's say a higher score indicates that the event includes the presence of a stop sign, then scores below a first threshold can be automatically rejected, scores between the first threshold and a second threshold can be sent to manual review for confirmation, and scores above the second threshold can be allowed to bypass manual review as they are highly likely to include the presence of a stop sign. In some embodiments, a high score indicates that the event does not include the presence of a stop sign, then scores above a first threshold can be automatically rejected, scores between the first threshold and a second threshold can be sent to manual review for confirmation, and scores below the second threshold can be allowed to bypass manual review as they are highly likely to include the presence of a stop sign.

Figure 6:
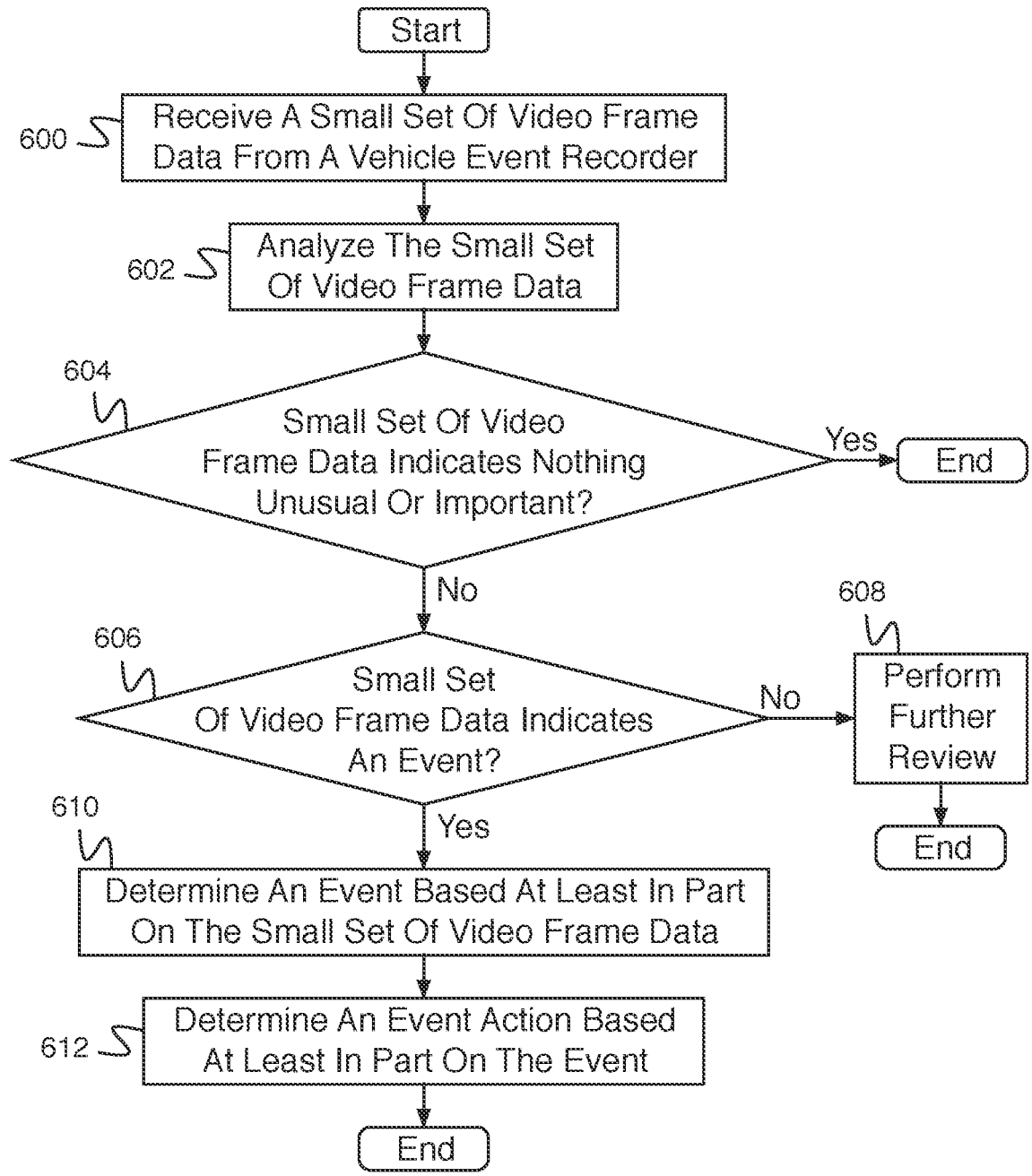
FIG. 6 is a flow diagram illustrating an embodiment of a process for video analysis for efficient sorting of event data.

FIG. 6 is a flow diagram illustrating an embodiment of a process for video analysis for efficient sorting of event data. In some embodiments, the process of FIG. 6 is executed by vehicle data server 104 of FIG. 1. In the example shown, in 600, a small set of video frame data is received from a vehicle event recorder. In some embodiments, a small set of video frame data comprises N video frames (e.g., N=1, 2, 3, 4, 5, 6, 7, 8, 9, etc.). In 602, the small set of video frame data is analyzed. For example, the small set of video frame data is analyzed using machine vision. In 604, it is determined whether the small set of video frame data indicates nothing unusual or important. For example, it is determined whether the small set of video frame data indicates that nothing unusual or important occurred (e.g., no anomalous event occurred) with a high degree of confidence. In the event it is determined in 604 that the small set of video frame data indicates nothing unusual or important, the process ends. For example, it is determined that an anomalous event did not occur. In the event it is determined in 604 that the small set of video frame data did indicate something unusual or important, control passes to 606. In 606, it is determined whether the small set of video data indicates an event. For example, it is determined whether the small set of video frame data indicates an event with enough confidence that further review is not needed. In the event it is determined in 606 that the small set of video frame data does not indicate an event, control passes to 608. In 608, further review is performed, and the process ends. In the event it is determined in 606 that the small set of video frame data indicates an event, control passes to 610. In 610, an event is determined based at least in part on the small set of video frame data. For example, using machine vision, analyze the small set of video frames to determine whether the video frames indicate an event, not an event, or that more data is needed for more analysis. In 612, an event action is determined based at least in part on the event.

Figure 7:
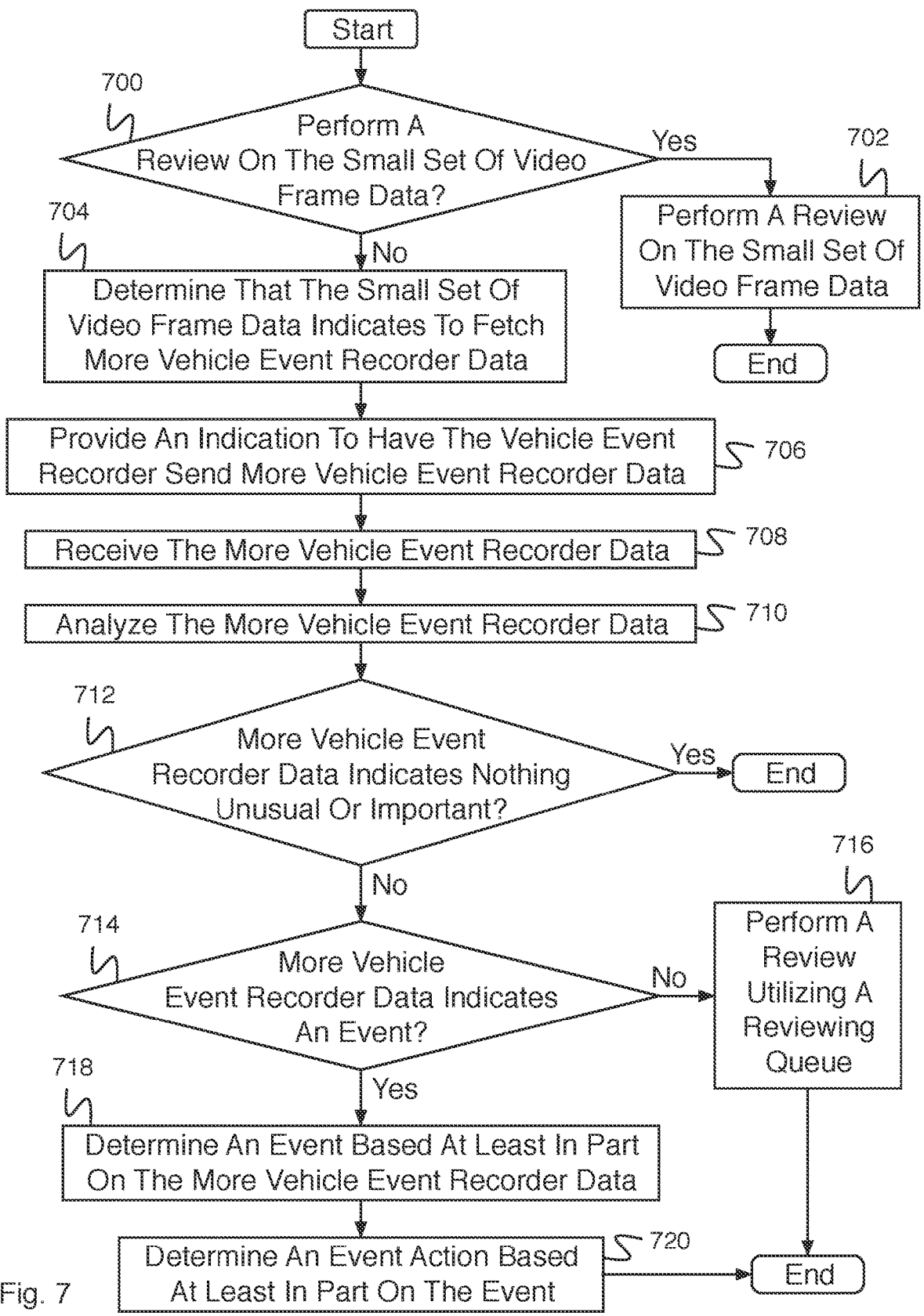
FIG. 7 is a flow diagram illustrating an embodiment of a process for performing a further review.

FIG. 7 is a flow diagram illustrating an embodiment of a process for performing a further review. In some embodiments, the process of FIG. 7 implements 608 of FIG. 6. In the example shown, in 700, it is determined whether to perform a review on the small set of video frame data. For example, it is determined whether the associated event type is such that a review (e.g., a manual review) of the small set of data is appropriate to determine whether an event occurred. In the event it is determined to perform a review on the small set of video frame data, control passes to 702. In 702, a review is performed on the small set of video frame data, and the process ends. In various embodiments, performing a review comprises indicating to perform a review, selecting a reviewer queue, providing the small set of video frame data to a reviewer queue, receiving reviewer responses, storing the reviewer responses, or any other appropriate steps. In the event it is determined in 700 not to perform a review on the small set of video frame data, control passes to 704. In 704, it is determined that the small set of video frame data indicates to fetch more vehicle event recorder data. For example, using machine vision, analyze the small set of video frames to determine whether the video frames indicate an event, not an event, or that more data is needed for more analysis. In various embodiments, more vehicle event recorder data comprises more video frames, video data, GPS data, accelerometer data, vehicle bus data, brakes data, vehicle status data, lane departure data, collision avoidance data, or any other appropriate data. In some embodiments, fetching more vehicle event recorder data comprises fetching S seconds of video (e.g., S=6, 7, 8, 9, 10, 11, 12, 13, 14, 15, etc.). In 706, an indication is provided to have the vehicle event recorder send more vehicle event recorder data. In 708, the more vehicle event recorder data is received. In 710, the more vehicle event recorder data is analyzed. For example, using machine vision, analyze the more extensive data set to determine whether the data indicate an event, not an event, or that more data is needed for more analysis. In 712, it is determined whether the more vehicle event recorder data indicates nothing unusual or important. For example, it is determined whether the more vehicle event recorder data indicates that nothing unusual or important occurred (e.g., no anomalous event occurred) with a high degree of confidence. In the event it is determined that the more vehicle event recorder data indicates nothing unusual or important, the process ends. In the event that the more vehicle event recorder data did indicate something unusual important, control passes to 714. In 714, it is determined whether the more vehicle event recorder data indicates an event. For example, it is determined whether the more vehicle event recorder data indicates an event with enough confidence that further review is not needed. In the event it is determined that the more vehicle event recorder data does not indicate an event, control passes to 716. In 716, a review is performed utilizing a reviewing queue, and the process ends. In various embodiments, performing a review comprises indicating to perform a review, selecting a reviewer queue, providing the small set of video frame data to a reviewer queue, receiving reviewer responses, storing the reviewer responses, or any other appropriate steps. In the event it is determined that the more vehicle event recorder data indicates an event, control passes to 718. In 718, an event is determined based at least in part on the more vehicle event recorder data. In 720, an event action is determined based at least in part on the event.

Figure 8:
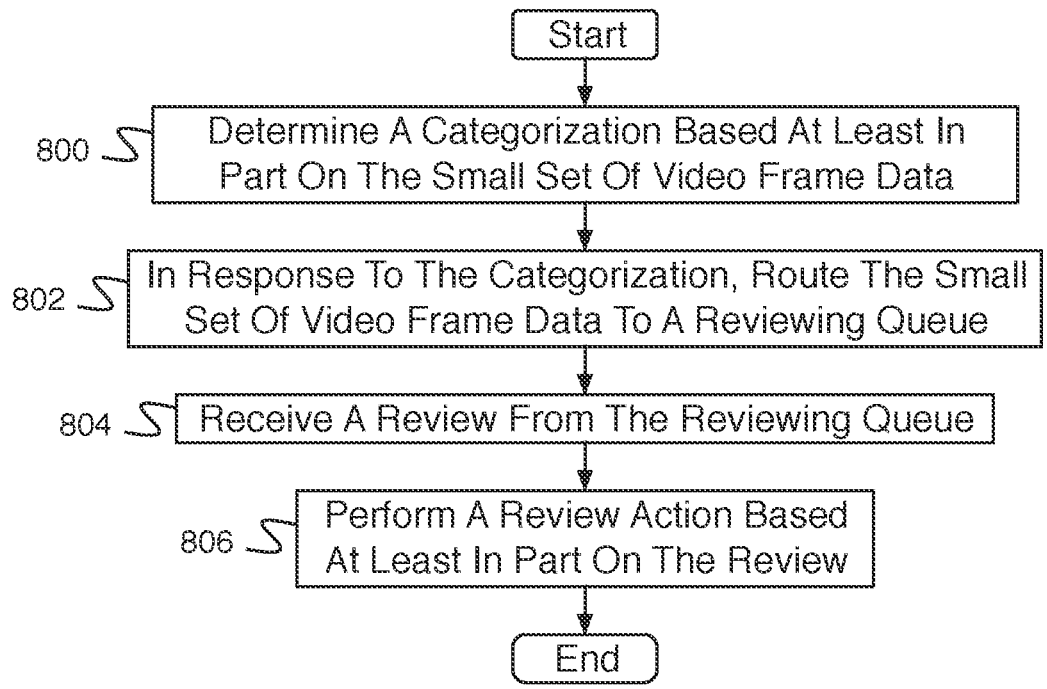
FIG. 8 is a flow diagram illustrating an embodiment of a process for performing a review on a small set of video frame data.

FIG. 8 is a flow diagram illustrating an embodiment of a process for performing a review on a small set of video frame data. In some embodiments, the process of FIG. 8 implements 702 of FIG. 7. In the example shown, in 800, a categorization is determined based at least in part on the small set of video frame data. For example, a categorization comprises a reviewing queue, a review type, a review use case, etc. In various embodiments, the categorization comprises one of not interesting, human review, movement analysis, collision review, etc. In 802, in response to the categorization, the small set of video frame data is routed to a reviewing queue. In 804, a review is received from the reviewing queue. In 806, a review action is performed based at least in part on the review.

Figure 9:
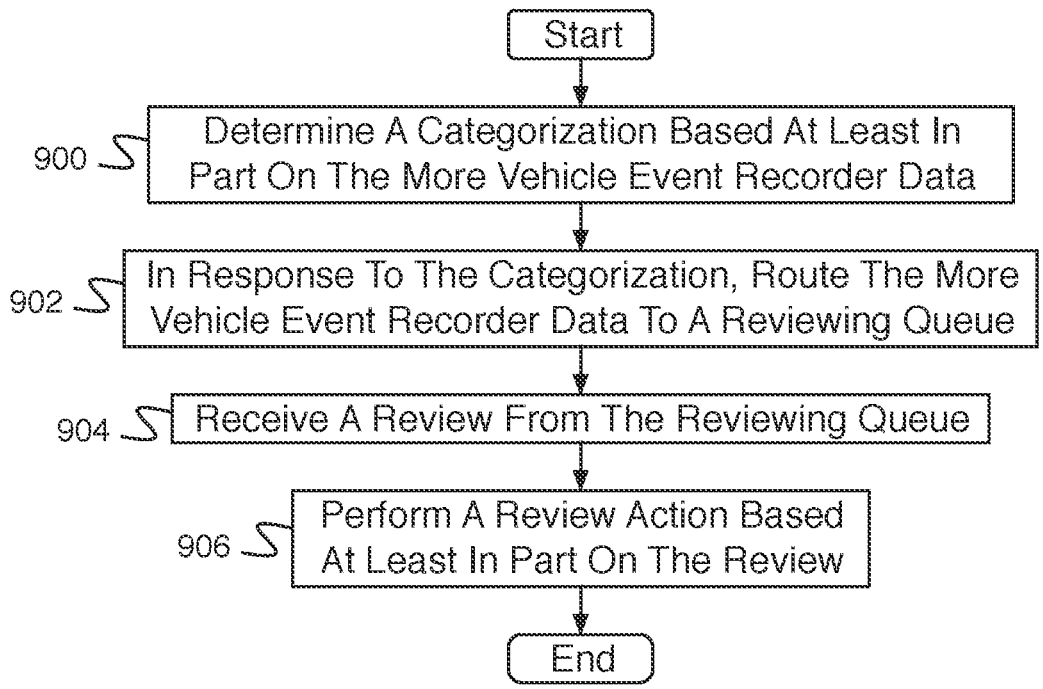
FIG. 9 is a flow diagram illustrating an embodiment of a process for performing a review using a queue.

FIG. 9 is a flow diagram illustrating an embodiment of a process for performing a review using a queue. In some embodiments, the process of FIG. 9 implements 716 of FIG. 7. In the example shown, in 900, a categorization is determined based at least in part on the more vehicle event recorder data. For example, a categorization comprises a reviewing queue, a review type, a review use case, etc. In various embodiments, the categorization comprises one or more of not interesting, human review, machine vision review, movement analysis, collision review, operational review, etc. In 902, in response to the categorization, the more vehicle event recorder data is routed to a reviewing queue. In 904, a review is received from the reviewing queue. In 906, a review action is performed based at least in part on the review.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for sorting event data, comprising:
an interface configured to:
receive a small set of video frame data from a vehicle event recorder; and
a processor configured to:
determine that the small set of video frame data indicates to fetch more vehicle event recorder data, comprises to:
determine that the small set of video frame data indicates that an anomalous event has occurred using a model, wherein the model implements a machine learning technique, wherein the machine learning technique includes machine vision, and wherein the determining that the small set of video frame data indicates that the anomalous event has occurred comprises to:
determine, using the model, that the small set of video frame data indicates that a trash bin is overflowing; and
in response a determination that the small set of video frame data indicates that the anomalous event has occurred, fetch the more vehicle event recorder data, comprising to:
determine that a score associated with the model falls between a first threshold and a second threshold, wherein in the event the score falls below the first threshold, determine that the anomalous event has not occurred and omit fetching the more vehicle event recorder data, wherein in the event the score falls above the second threshold, determine that the anomalous event has occurred and omit fetching the more vehicle event recorder data; and
in the event that the score falls between the first threshold and the second threshold, fetch the more vehicle event recorder data;
determine a categorization based at least in part on the more vehicle event recorder data, wherein the categorization includes human review; and
in response to the categorization, route the more vehicle event recorder data to a reviewing queue to determine whether the trash bin is overflowing.

2. The system of claim 1, wherein the processor is further configured to provide an indication to have the vehicle event recorder send more vehicle event recorder data.

3. The system of claim 1, wherein the processor is further configured to receive the more vehicle event recorder data.

4. The system of claim 1, wherein a small set of video frame data comprises N video frames.

5. The system of claim 4, wherein N is 6.

6. The system of claim 1, wherein fetching more vehicle event recorder data comprises fetching S seconds of video.

7. The system of claim 6, wherein S is 12.

8. The system of claim 1, wherein fetching more vehicle event recorder data comprises fetching GPS data.

9. The system of claim 1, wherein determining a categorization uses machine vision.

10. The system of claim 1, wherein determining that the small set of video frame data indicates to fetch more vehicle event recorder data uses machine vision analysis.

11. The system of claim 1, further comprises determining whether to perform a review of the small set of video frame data.

12. The system of claim 11, wherein in response to determining to perform the review of the small set of video frame data, indicating to perform a review of the small set of video frame data.

13. The system of claim 1, further comprising determining whether an analysis of the more vehicle event recorder data indicates nothing unusual.

14. The system of claim 1, further comprising determining whether an analysis of the more vehicle event recorder data indicates an event.

15. The system of claim 14, wherein in response to determining that the analysis of the more vehicle event recorder data indicates to perform a review of the more vehicle event recorder data.

16. The system of claim 1, wherein the reviewing queue comprises a human reviewing queue or a machine vision reviewing queue.

17. A method for sorting event data, comprising:
receiving a small set of video frame data from a vehicle event recorder;
determining, using a processor, that the small set of video frame data indicates to fetch more vehicle event recorder data, comprises:
determining that the small set of video frame data indicates that an anomalous event has occurred using a model, wherein the model implements a machine learning technique, wherein the machine learning technique includes machine vision, and wherein the determining that the small set of video frame data indicates that the anomalous event has occurred comprises:
determining, using the model, that the small set of video frame data indicates that a trash bin is overflowing; and
in response a determination that the small set of video frame data indicates that the anomalous event has occurred, fetching the more vehicle event recorder data, comprising:
determining that a score associated with the model falls between a first threshold and a second threshold, wherein in the event the score falls below the first threshold, determine that the anomalous event has not occurred and omit fetching the more vehicle event recorder data, wherein in the event the score falls above the second threshold, determine that the anomalous event has occurred and omit fetching the more vehicle event recorder data; and in the event that the score falls between the first threshold and the second threshold, fetching the more vehicle event recorder data;

determining a categorization based at least in part on the more vehicle event recorder data, wherein the categorization includes human review; and in response to the categorization, routing the more vehicle event recorder data to a reviewing queue to determine whether the trash bin is overflowing.

18. A computer program product for sorting event data, the computer program product being embodied in a non-transitory computer readable storage medium and comprising computer instructions for:

receiving a small set of video frame data from a vehicle event recorder;

determining that the small set of video frame data indicates to fetch more vehicle event recorder data, comprises:

determining that the small set of video frame data indicates that an anomalous event has occurred using a model, wherein the model implements a machine learning technique, wherein the machine learning technique includes a deep machine vision, and wherein the determining that the small set of video frame data indicates that the anomalous event has occurred comprises:

determining, using the model, that the small set of video frame data indicates that a trash bin is overflowing; and in response a determination that the small set of video frame data indicates that the anomalous event has occurred, fetching the more vehicle event recorder data, comprising:

determining that a score associated with the model falls between a first threshold and a second threshold, wherein in the event the score falls below the first threshold, determine that the anomalous event has not occurred and omit fetching the more vehicle event recorder data, wherein in the event the score falls above the second threshold, determine that the anomalous event has occurred and omit fetching the more vehicle event recorder data; and in the event that the score falls between the first threshold and the second threshold, fetching the more vehicle event recorder data;

determining a categorization based at least in part on the more vehicle event recorder data, wherein the categorization includes human review; and in response to the categorization, routing the more vehicle event recorder data to a reviewing queue to determine whether the trash bin is overflowing.

* * * * *